May 20, 1924.                                                                  1,494,733
C. CARPENTER ET AL
MAGNETO TESTING AND RECHARGING DEVICE
Filed June 8, 1922
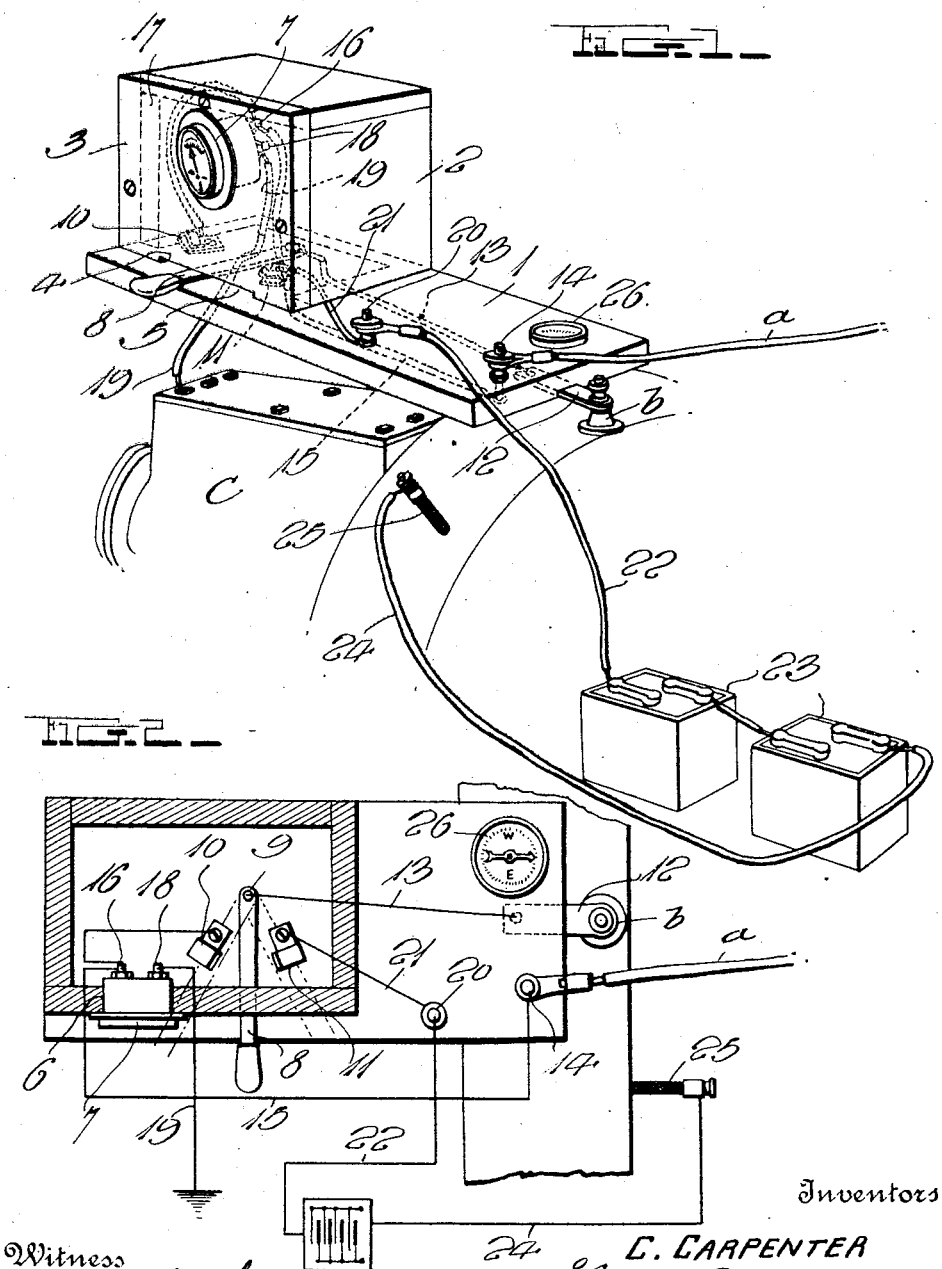

Patented May 20, 1924.

1,494,733

UNITED STATES PATENT OFFICE.

CHESTER CARPENTER AND EUGENE GREEN, OF HAVILAND, KANSAS.

MAGNETO TESTING AND RECHARGING DEVICE.

Application filed June 8, 1922. Serial No. 566,806.

*To all whom it may concern:*

Be it known that we, CHESTER CARPENTER and EUGENE GREEN, citizens of the United States, residing at Haviland, in the county of Kiowa and State of Kansas, have invented certain new and useful Improvements in Magneto Testing and Recharging Devices; and we do declare the following to be a full, clear, and exact description of the invention, such as will enable others skilled in the art to which it appertains to make and use the same.

This invention relates to a magneto testing and recharging device, that is, a device by which the permanent magnets of a magneto may be tested and recharged if necessary.

The principle of the invention may be embodied in devices suitable for use in testing and recharging various types of magnetos, but the invention has been designed with the particular purpose of testing and recharging the permanent magnets of magnetos of and similar to the type used in connection with the well known Ford automobile and the Fordson tractor.

The type of magneto in connection with which the present invention is particularly adapted to be used, has a rotatable field composed of permanent magnets, and a stationary armature composed of coils which when energized produce electro-magnets. After being used for a while the permanent magnets of the magneto lose their strength which renders the magneto incapable of performing its function. It then becomes necessary to either replace the weak permanent magnets with new magnets or else to recharge the weak permanent magnets.

In order to recharge the permanent magnets of a magneto it has been the custom to remove them and do so individually, or else to remove them from the machine upon which they are installed and recharge them as a unit. Either of these methods require considerable time, and are to a great extent unsatisfactory because it has been impossible to recharge all of the magnets the same amount and to recharge the entire unit to exactly the proper amount. Then, in assembling the recharged magnets in the machine the incidental hammering and work upon them in doing so has caused them to lose some of their magnetic properties, which of course is undesirable.

The present invention provides an improved method for recharging the permanent magnets of a magneto, as in order to accomplish this result the magnets do not have to be removed at all from the machine upon which they are installed. The method makes use of the field coils of the magneto to recharge the permanent magnets thereof. Therefore, by using the present invention the permanent magnets of a magneto may be recharged in from five to fifteen minutes, whereas the methods heretofore used have required about eleven hours. Furthermore, by using the present invention all of the magnets may be recharged equally and to exactly the desired amount.

The invention consists of the novel features of construction, and the combination and arrangement of parts as are hereinafter described and claimed, and shown in the accompanying drawing.

In the drawing, Fig. 1 is a perspective view of a practical embodiment of the invention designed for use in connection with Ford automobiles and Fordson tractors, and illustrating it applied to the parts of the engine of the Ford automobile; and Fig. 2 is a top plan view, partly in section, of the device illustrated in Fig. 1 and illustrating the wiring therefor diagrammatically.

In the drawing, which as hereinbefore stated illustrates a practical embodiment of the invention designed especially for use in connection with Ford automobiles and Fordson tractors, the numeral 1 designates what may be termed an instrument board or support. This board is by preference of rectangular shape and of course is made of wood or some other suitable insulating material. Mounted upon the board 1, preferably occupying approximately about one-half of the surface thereof, is a hollow box or casing 2, which is also made of wood or some other suitable insulating material. It is desirable to have what may be termed the front side of the box or casing 2 provided with a removable plate 3 of the nature of a cover plate, and the lower edge of this plate is cut away as at 4 so as to provide a comparatively long narrow slot 5 leading into the interior of the box or casing 2.

The plate 3 is provided with a substantially circular opening 6 and mounted in this opening is a magneto testing instrument, commonly termed a magnetometer 7. This instrument is of a well known construction, and therefore the construction thereof forms no part of the present invention. As shown in the drawing it is mounted upon the plate 3 so that its dial is disposed on the outer side of the plate and so that its terminals are located within the box or casing 2.

The numeral 8 designates the movable member or blade of a two-way switch. This blade 8 is pivoted at 9 upon the board 1 within the interior of the box 2, and it works back and forth in said slot and has its swinging end disposed outside of the box 2, at which point it is preferably provided with a handle.

Mounted upon the board 1 within the box 2 on the opposite sides of the switch blade 8 are clips 10 and 11, which form fixed contacts for the switch. When the blade 8 is swung in one direction it will engage the clip or contact 10, and when swung in the other direction it will engage the clip or contact 11.

Secured to the board 1 in any suitable manner and preferably extending longitudinally from that end which is remote from the box 2, is an attaching ear or lug 12. This ear or lug 12 is made of metal and is electrically connected with the switch blade 8 by means of an electric conductor 13, which is preferably secured to the lower side of the board 1.

Mounted upon the board 1 at any suitable location is a binding post 14, which is electrically connected by a conductor 15 to one terminal 16 of the magnetometer 7. This terminal 16 of the magnetometer is also connected by means of a conductor 17 to the clip or fixed contact 10. The other terminal 18 of the magnetometer has connection with a conductor 19 which passes through one wall of the box 2 and has a portion extending outside of the box and adapted to be grounded to the frame work of the engine carrying the dynamo desired to be tested and recharged.

The board 1 is also provided with a second binding post 20 which is electrically connected by a conductor 21 with the clip or fixed contact 11. To the binding post 20 is connected a wire or conductor 22 leading from the positive terminal of a pair of storage batteries 23, from the negative terminal of which extends a wire or conductor 24 having at its free end a carbon electrode 25.

Mounted upon the board 1 at a point adjacent the attaching ear or lug 12 is a magnetic compass or needle 26. This is preferably placed so that the point on its dial marked "N" for north will be adjacent the end edge of the board 1 which is remote from the box 2.

In case the magneto of a Ford automobile or a Fordson tractor does not generate enough current to properly run the engine, the conductor a leading from the terminal block or switch on the dashboard of the machine should be disconnected from the binding post b forming one of the magneto terminals. The board 1 carrying all of its parts should then be placed above the transmission case c of the engine and the attaching ear or lug 12 should be connected and secured to the binding post or terminal b. The conductor a should then be connected to the binding post 14. Then, in order to test the magneto with the magnetometer 7, the engine should be started and the switch blade should be shifted so as to engage the clip or contact 10. When this has been done the electric current will flow from the terminal b to the ear or lug 12, and through conductor 13, switch blade 8, contact 10, conductor 17, conductor 15, binding post 14, and conductor 8, and then through the usual parts of the machine to the other terminal of the magneto. At the same time the electric current will pass through the magnetometer 7 from conductor 17 to conductor 19, so long as the latter is grounded to the frame of the machine. When this takes place the magnetometer will register the strength of the magneto.

If the magnetometer registers that the magneto is weak and needs recharging, the engine should be stopped and the switch blade 8 should then be swung out of engagement with the contact 10 and into engagement with the contact 11. Then, the motor should be turned by hand until it is at such a point that the needle of the compass 26 registers north. When the needle of the compass 26 registers north with the device applied as hereinbefore explained, the rotatable field magnets of the magneto will be in such position that when current flows from the batteries 23 the coils will be energized so that they will recharge the permanent magnets of the magneto with the proper polarity. After the motor has been turned by hand so that the needle of the compass 26 registers north, the electrode 25 should be touched to the frame work of the engine for about twenty-five times, holding it in contact with the frame work of the engine, for about four to six seconds each time. This energizes the coils of the magneto in such a way that the permanent magnets thereof will be recharged.

After the magneto has been recharged, the switch blade 8 should be shifted in the opposite direction so as to engage the contact 10, and the motor should be started. If, then, the magnetometer 7 still indicates that the magneto is weak, further recharging should be done. If, however, the magnetometer indicates that the magneto is overcharged, the switch blade 8 should be engaged with the contact 11, and the motor should be turned until the needle of the compass 26 points south. Then, the electrode 25 should be tapped upon the frame work of the engine a few times. In doing this some of the magnetism will be drawn out of the permanent magnets of the magneto.

From the foregoing description, taken in connection with the accompanying drawing, it will be seen that a thoroughly practical and reliable embodiment of the invention has been disclosed. It will also be seen that by using the device the permanent magnets of a magneto may be tested and recharged to exactly the proper amount without removing them from the engine in which they are installed. Thus, the invention incidentally makes the method of recharging a magneto very simple and quick.

It is obvious that the principle of the invention can be carried out in other embodiments besides the disclosed embodiment, and hence it is to be understood that within the scope and meaning of the appended claim changes in construction and arrangement of parts may be made.

We claim:

A device of the character described comprising an instrument support adapted to be held above the transmission case of a vehicle engine, instruments mounted upon and associated with said support for testing and recharging the permanent magnets of the magneto of the engine and having terminals for electrical connection to parts of the engine, and an attaching ear serving as one of said terminals, mounted upon said support, and being adapted for attachment to one terminal of the stationary field coils of the magneto of the engine.

In testimony whereof we have hereunto set our hands.

CHESTER CARPENTER.
EUGENE GREEN.